(12) United States Patent
Flury et al.

(10) Patent No.: US 8,385,187 B2
(45) Date of Patent: Feb. 26, 2013

(54) METHOD FOR RETRIEVING DATA FROM ULTRA WIDEBAND RADIO TRANSMISSION SIGNALS AND RECEIVER IMPLEMENTING SAID METHOD

(75) Inventors: Manuel Flury, Lausanne (CH); Ruben Merz, Berlin (DE); Jean-Yves Le Boudec, Jouxtens-Mezery (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 347 days.

(21) Appl. No.: 12/865,521

(22) PCT Filed: Feb. 5, 2009

(86) PCT No.: PCT/IB2009/050468
§ 371 (c)(1),
(2), (4) Date: Jul. 30, 2010

(87) PCT Pub. No.: WO2009/098652
PCT Pub. Date: Aug. 13, 2009

(65) Prior Publication Data
US 2010/0309875 A1    Dec. 9, 2010

Related U.S. Application Data

(60) Provisional application No. 61/006,972, filed on Feb. 8, 2008.

(51) Int. Cl.
*H04J 7/00* (2006.01)
(52) U.S. Cl. ........ 370/212; 370/213; 370/329; 370/332; 370/341; 370/526; 370/533; 370/620; 375/260; 375/346
(58) Field of Classification Search .................. 370/212, 370/213, 329, 332, 341, 620, 526, 533; 375/231, 375/240, 260, 296, 340, 346, 350
See application file for complete search history.

(56) References Cited

U.S. PATENT DOCUMENTS
(Continued)

FOREIGN PATENT DOCUMENTS
DE     1 917 357       5/1970
WO     WO 01/76086    10/2001
(Continued)

OTHER PUBLICATIONS

Manuel Flury et al., "Performance evaluation of an ieee 802.15.4a physical layer with energy detection and multi-user interference," IEEE International Conference on Ultra Wideband 2007, Sep. 2007, pp. 663-668.

(Continued)

*Primary Examiner* — Christopher Grey
(74) *Attorney, Agent, or Firm* — DLA Piper LLP US

(57) ABSTRACT

The present invention concerns a receiver and a method for retrieving data from Ultra wideband radio transmission signals received by a receiver and transmitted in packets containing at least a preamble known to the receiver and a payload containing data unknown to the receiver. The payload data is formed of at least one burst containing at least one pulse. The method comprises the steps of receiving a signal corresponding to the preamble of a packet by a receiver; determining the energy of the received signal; determining weighting coefficients from the energy of the received signal; receiving a signal corresponding to the payload of a packet by a receiver; determining the energy of the received signal; calculating a threshold depending on the weighting coefficients; and applying a decision rule based on the sampled energy, weighted by said weighting coefficients and depending on said calculated threshold.

21 Claims, 4 Drawing Sheets

U.S. PATENT DOCUMENTS

| | | | |
|---|---|---|---|
| 3,069,654 | A | 12/1962 | Hough |
| 6,335,949 | B1 | 1/2002 | Kim |
| 7,327,794 | B2 * | 2/2008 | Fanson et al. .................. 375/260 |
| 7,613,257 | B2 | 11/2009 | El Fawal et al. |
| 8,140,017 | B2 * | 3/2012 | Shi et al. ......................... 455/62 |
| 2004/0120409 | A1 * | 6/2004 | Yasotharan et al. .......... 375/260 |
| 2005/0254604 | A1 * | 11/2005 | MacMullan et al. .......... 375/340 |
| 2006/0093077 | A1 | 5/2006 | El Fawal et al. |
| 2006/0158358 | A1 | 7/2006 | Seo et al. |
| 2007/0127600 | A1 | 6/2007 | Sato et al. |
| 2008/0069260 | A1 | 3/2008 | Wellig |
| 2009/0075590 | A1 | 3/2009 | Sahinoglu et al. |

FOREIGN PATENT DOCUMENTS

| | | |
|---|---|---|
| WO | WO 02/32008 | 4/2002 |
| WO | WO 02/101942 | 12/2002 |
| WO | WO 2005/074150 | 8/2005 |
| WO | WO 2006/112846 | 10/2006 |
| WO | WO 2006/112850 | 10/2006 |
| WO | WO 2007/011357 | 1/2007 |
| WO | WO 2007/018133 | 2/2007 |
| WO | WO 2009/098652 | 8/2009 |

OTHER PUBLICATIONS

Fred S. Lee et al., "A 2.5nj/b 0.65v 3-to-5ghz subbanded UWB receiver in 90nm CMOS," in ISSCC 07, Feb. 2007, pp. 116-117, and 590.

Cecilia Carbonelli et al., "M-ppm noncoherent receivers for UWB applications," IEEE Transactions on Wireless Communications, vol. 5, No. 8, pp. 2285-2294, Aug. 2006.

Martin Weisenhorn et al., "Robust Noncoherent Receiver Exploiting UWB Channel Properties," International Workshop on Ultra Wideband Systems 2004, Joint Conference on Ultrawideband Systems and Technologies. Joint UWBST & IWUWBS, May 2004, pp. 156-160.

Mustafa E. Sahin, et al., "Optimization of Energy Detector Receivers for UWB Systems," in IEEE Spring VTC 05, vol. 2, 5 pages (2005).

Majid A. Nemati et al., "Optimum Integration Time for UWB Transmitted Reference and Energy Detector Receivers," in IEEE MILCOM 06, Oct. 2006, pp. 1-7.

Zhi Tian et al., "Weighted Energy Detection of Ultra-Wideband Signals," in IEEE SPAWC 05, Jun. 2005, pp. 1068-1072.

Martin Weisenhorn et al., "ML Receiver for Pulsed UWB Signals and Partial Channel State Information", IEEE International Conference on Ultra-Wideband, 2005, pp. 180-185.

Antonio A. D'Amico et al., "Energy-Detection UWB Receivers with Multiple Energy Measurements," IEEE Trans. Wireless Commun., vol. 6, No. 7, pp. 2652-2659, Jul. 2007.

Chunjie Duan et al., "A Non-Coherent 802.15.4a UWB Impulse Radio," IEEE International Conference on Ultra-Wideband 2007, Sep. 2007, pp. 146-151.

Arthur D. Spaulding et al., "Optimum Reception in an Impulsive Interference Environment—Part I: Coherent Detection," IEEE Trans. Commun., vol. 25, No. 9, pp. 910-923, Sep. 1977.

Saleem A. Kassam et al., "Robust Signal Processing for Communication Systems," IEEE Commun. Mag., vol. 21, No. 1, pp. 20-28, Jan. 1983.

Raymond Knopp et al., "Achievable Rates for UWB Peer-to-Peer Networks," Int. Zurich Seminar on Communications (IZS), Feb. 18-20, 2004, pp. 82-85.

Ruben Merz et al., "A Joint PHY/MAC Architecture for Low-Radiated Power TH-UWB Wireless Ad-Hoc Networks," Wireless Communications and Mobile Computing Journal, Special Issue on Ultrawideband (UWB) Communications, vol. 5, No. 5, pp. 567-580, Aug. 2005.

Manuel Flury et al., "Interference Mitigation by Statistical Interference Modeling in an Impulse Radio UWB Receiver," The 2006 IEEE 2006 International Conference on Ultra-Wideband, Sep. 2006, pp. 393-398.

Norman C. Beaulieu et al., "An Adaptive Threshold Soft-Limiting UWB Receiver with Improved Performance in Multiuser Interference", The 2006 IEEE 2006 International Conference on Ultra-Wideband, 2006, pp. 405-410.

Jeebak Mitra et al., "Robust Detectors for TH IR-UWB Systems with Multiuser Interference," IEEE International Conference on Ultra-Wideband, 2007. ICUWB 2007, Sep. 2007, pp. 745-750.

International Search Report issued in PCT/IB2009/050468, mailed Jun. 2, 2009.

Written Opinion issued in PCT/IB2009/050468, mailed Jun. 2, 2009.

European Search Report Issued in EP 09 16 9176, issued May 3, 2010.

Zafer Sahinoglu et al., "Multiuser Interface Mitigation in Noncoherent UWB Ranging via Nonlinear Filtering", EURSIP Journal of Wireless Communication and Networking, vol. 2006, Article ID 56849, pp. 1-10 (2006).

Davide Dardari et al., "Time-of-Arrival Estimation of UWB Signals in the Presence of Narrowband and Wideband Interference", IEEE International Conference on Ultra-Wideband 2007, pp. 71-76 (2007).

Ricard O. Duda et al., "Use of the Hough Transformation to Detect Lines and Curves in Pictures", Communications of the ACM, vol. 15, No. 1, pp. 11-15 (Jan. 1972).

A. Wellig et al., "Trellis-Based Maximum-Likelihood Crystal Drift Estimator for Ranging Applications in UWB-LDR", IEE International Conference on Ultra-Wideband 2006, pp. 539-544 (2006).

Alaeddine El Fawal et al., "A Robust Signal Detection method for Ultra Wide Band (UWB) Networks with Uncontrolled Interference", IEEE Transactions on Microwave Theory and Techniques (MTT), vol. 54, No. 4, part 2, pp. 1769-1781 (2006).

Manuel Flury et al., "An Energy Detection Receiver Robust to Multi-User Interference for IEEE 802.15.4a Networks", International Conference on Ultra-Wideband (ICUWB 2008), Sep. 10-12, 2008 (4 pages).

"802.15.4: IEEE Standard for Information Technology—Telecommunication and Information Exchange Between Systems—Local and Metropolitan Area Networks—Specific Requirements; Part 15.4: Wireless Medium Access Control (MAC) and Physical Layer (PHY) Specifications for Low-Rate Wireless Personal Area Networks (WPANs)"; IEEE Computer Society; pp. iii-xvi, and 1-305; Sep. 8, 2006.

"802.15.4a: IEEE Standard for Information Technology—Telecommunication and Information Exchange Between Systems—Local and Metropolitan Area Networks—Specific Requirements; Part 15.4: Wireless Medium Access Control (MAC) and Physical Layer (PHY) Specifications for Low-Rate Wireless Personal Area Networks (WPANs); Amendment 1: Add Alternate PHYs"; IEEE Computer Society; pp. iv-xiv, and 1-187; Aug. 31, 2007.

G.Y. Chen et al., "Invariant Radon-Wavelet Packet Signatures for Pattern Recognition", IEEE CCECE/CCGEI, Ottawa, pp. 1471-1474 (May 2006).

Image File History of U.S. Appl. No. 12/874,052, electronically captured from PAIR on Nov. 11, 2010.

* cited by examiner

METHOD FOR RETRIEVING DATA FROM ULTRA WIDEBAND RADIO TRANSMISSION SIGNALS AND RECEIVER IMPLEMENTING SAID METHOD

A. FIELD OF THE INVENTION

The present invention relates to a method for retrieving ultra wideband radio transmission signals. More specifically, the invention relates to a robust low-complexity receiver scheme and method for communicating via ultra-wideband (UWB) radio transmission signals. In particular, the scheme allows for robust reception of the transmitted UWB signal even in the presence of interfering signals from concurrently transmitting devices and with packet structures having a preamble and a payload, where the signaling format of the preamble may differ from the signaling format of the payload. The invention also relates to a receiver for implementing the method of the invention.

B. BACKGROUND OF THE INVENTION

The IEEE 802.15.4 standard (IEEE standard for information technology-telecommunications and information exchange between systems—local and metropolitan area networks—specific requirements part 15.4: Wireless medium access control (MAC) and physical layer (PHY) specifications for low-rate wireless personal area networks (WPANS)," IEEE Std 802.15.4-2006 (Revision of IEEE Std 802.15.4-2003), 2006) targets low data rate wireless networks with extensive battery life and very low complexity. Its physical layer is based on a narrowband radio, operating in the unlicensed ISM band at 2.4 GHz. IEEE 802.15.4a (IEEE P802.15.4a (amendment of IEEE std 802.15.4), part 15.4: Wireless medium access control (MAC) and physical layer (PHY) specifications for low-rate wireless personal area networks (LRWPANs)," September 2006.) is an amendment to the 802.15.4 specification. It adds an impulse-radio ultra-wide band (IR-UWB) physical layer operating in several bands of 500 MHz (and 1.5 GHz) from approximately 3 GHz to 10 GHz. This physical layer should offer a better robustness against interference and multipath propagation channels, a higher data rate and the possibility to perform ranging between devices. The IEEE 802.15.4a amendment allows for implementing either a coherent receiver or a non-coherent receiver. Due to their relatively low complexity, non-coherent receivers based on energy detection are of great interest for sensor network applications where devices should be inexpensive and have extremely low power consumption. Generally, non-coherent receivers based on energy detection are however less robust to interference than coherent receivers. It has been shown in [1] that classical energy detection receivers designed to cope with thermal noise only perform close to worst case in the presence of multi-user interference (MUI). MUI occurs due to concurrent packet transmissions. The mandatory medium access control (MAC) protocol in the IEEE 802.15.4a amendment is Aloha. With such a MAC protocol concurrent transmissions inevitably occur. MUI also occurs if several uncoordinated piconets operate in close vicinity, which is a likely scenario for devices operating in unlicensed UWB spectrum.

Scenarios like the ones described above show that there is a need for low-complexity non-coherent receivers that are able to cope not only with thermal noise and hostile channel conditions but also with the presence of MUI created by concurrently transmitting devices.

II. PRIOR ART AND RELATED WORK

The design objectives used for the receiver of the present invention are radically different from classical design objectives for radio receivers; the receiver of the present invention is designed according to the fact that interference from other transmitters could occur, whereas classical design objectives only consider thermal noise. This directly leads to the new receiver architecture.

Nevertheless, there is still prior art and related work on impulse-radio UWB systems that is worth discussing.

Among this prior art, patent application WO 2005/074150 relates to a robust method and system for communicating via ultrawideband (UWB) radio transmission signals over multipath channels. The system comprises an optimized non-coherent receiver structure that may lead to robust error rate performance for a wide variety of UWB multi-path channels. The non-coherent receiver is actually an energy detection receiver where a weighting function can be applied to the received signal. The duration of the integration period can also be adapted. However, the invention in this document does neither consider MUI (no form of MUI mitigation) nor burst transmissions like in the IEEE 802.15.4a standard. Furthermore, how to compute a possible weighting function or how to adapt the integration time is not mentioned.

Patent application WO 2002/032008 proposes an interference canceling technique for reducing narrowband interference in an impulse-radio UWB receiver. This technique assumes a correlator (coherent) receiver and does not apply to MUI.

The possibility of weighting the received signal is mentioned in patent application WO 2002/101942. However, no details are given on a possible weighting method in the receiver. And as in WO 2002/032008 the receiver considered is a coherent correlator receiver and burst transmissions are not envisioned.

In patent application WO 2001/076086, the use of multiple correlators to improve performance is proposed. There is no mention though of its usage for the estimation of the energy-delay profile for burst transmissions.

The inventions in patent applications WO 2007/018133, WO 2006/112850, WO 2007/011357 address issues related to synchronization and time-of-arrival (TOA) estimation of a radio signal. They are of interest since they are focused on low-complexity implementations with energy detection receivers. In WO 2007/018133, a method is proposed to robustly select a threshold for the detection of a signal in the presence of Gaussian noise. In WO 2006/112850, several methods are proposed for the analysis of a radio signal in the context of ranging and time-of-arrival estimation problems. Finally, in WO 2007/011357, one of the claims addresses the identification of the mean noise energy level and of the noise energy variance in the received radio signal. However, none of them addresses demodulation issues as our receiver does. Also, the presence of MUI is not considered.

In patent application US 2006 0093077, a method to synchronize to an impulse radio signal in a receiver based on a cross-correlation between an input signal and a template pulse train is described. The work in US 2006 0093077 is of interest as thresholding is applied on the correlation input. This has the effect of making the synchronization method more robust when MUI is present. Note that the work in US 2006 0093077 does not address demodulation issues as does the receiver of the present invention and assumes a coherent receiver architecture.

There is a large body of papers that address energy detection receivers for impulse-radio UWB systems.

The work in [7] describes a classic energy detector where the energies collected by the receiver are simply compared. Many papers recognize that it is necessary to adapt the duration of the integration window of the energy detection receiver to the characteristics of the received signal. There are several proposals of energy detection receivers where the integration time is adapted. See for examples references [8], [9], [10]. There are more sophisticated approaches described in [11], [12], [13], where the authors take advantage of partial channel state information for designing the receiver (and not only adapting the integration time), for instance, by using a weighting function. The work in [12], [13] clearly exhibits the optimality of an energy detector with a weighting function in the case the interference consists only of additive white Gaussian noise (AWGN). Examples of hardware structures to implement an energy detection receiver can be found in [6], [14]. However, none of the previous work considers MUI. Nor do they consider burst transmissions like they are used in the IEEE 802.15.4a amendment. As shown in [1], the performance degradation if MUI is not taken into account can be huge in the case such an energy detection receiver is used.

The idea of using a threshold or a non-linearity to reduce the impact of large samples from non-Gaussian interference is not new; see for instance [15], [16]. Interference created by other transmitters in impulse-radio UWB systems is not Gaussian; the probability density function of the interference exhibits an impulsive shape. As such, thresholding structures are beneficial (see [17], [18]) for the performance of impulse-radio UWB receivers. Examples of receivers using such structures can be found in [17], [18], [19], [20], [21] and the references therein. In order to be effective, the threshold must be continuously adapted, in particular, with respect to the signal-to-noise ratio of the signal of interest. This adaptation is actually far from being trivial and no solution to this particular problem is mentioned in the related work. Also, except [17] no prior art has considered the use of a thresholding mechanism with an energy detection receiver. All the related work considers coherent receiver structures. Further, additional care must be taken when the structure of the preamble is not identical to the structure of the payload.

C. SUMMARY Of THE INVENTION

Estimation and adaptation of the threshold to mitigate MUI, determination and estimation of weight function, as well as a solution in the case of a different signaling structure in the payload and in the preamble are elements that are addressed and solved with the present invention. Furthermore, these issues are solved with a realistic, low-complexity receiver based on energy detection.

The objects of the present invention is achieved by a method for retrieving data from Ultra wideband radio transmission signals received by a receiver and transmitted in packets containing at least a preamble known to the receiver and a payload containing data unknown to the receiver, said payload data being formed of at least one burst containing at least one pulse, said method comprising the following steps:
  receiving a signal corresponding to the preamble of a packet by a receiver;
  determining the energy of the received signal;
  determining weighting coefficients $p_m$ from the energy of the received signal;
  receiving a signal corresponding to the payload of a packet by a receiver;
  determining the energy of the received signal;
  calculating a threshold depending on the weighting coefficients;
  applying a decision rule based on the sampled energy, weighted by said weighting coefficients $p_m$ and depending on said calculated threshold.

The objects of the present invention is also achieved by a receiver for receiving and retrieving data from Ultra wideband radio transmission signals transmitted in packets containing at least a preamble known to the receiver and a payload containing data unknown to the receiver, said payload data being formed of at least one burst containing at least one pulse, said receiver containing:
  means for receiving a signal corresponding to the preamble of a packet by a receiver;
  means for determining the energy of the received signal;
  means for determining weighting coefficients $p_m$ from the energy of the received signal;
  means for receiving a signal corresponding to the payload of a packet by a receiver;
  means for determining the energy of the received signal;
  applying a decision rule based on the sampled energy, weighted by said weighting coefficients $p_m$ and depending on said calculated threshold.

Further, the objects of the invention is achieved by a method for calculating weighting coefficients $p_m$ used for retrieving data from Ultra wideband radio transmission signals received by a receiver and transmitted in packets containing at least a preamble known to the receiver and a payload containing data unknown to the receiver, said payload data being formed of at least one burst containing at least two pulses, said method comprising the following steps :
  receiving a signal corresponding to the preamble of a packet by a receiver;
  determining the energy of the received signal;
  providing time delayed copies of said received signal, the number of copies being equal to the number of pulses per burst, minus one;
  processing said received signal and said time delayed signals to obtain a number of output signals corresponding to the number of pulses per burst;
  sampling said processed signals and said received signal to obtain weighting output values $Y_{m,i}^{pre}$;
  calculating weighting parameters $\hat{w}_m^{(1)}$ from said output values;
  and determining the weighting coefficients $p_m$ from the weighting parameters, said weighting coefficients $p_m$ being obtained by:

$$\hat{p}_m = \sum_{i=0}^{L_b-1} \hat{w}_{m-iK}^{(0)} + 2 \sum_{i=0}^{L_b-1} \sum_{j=i+1}^{L_b-1} b_i b_j \hat{w}_{m-iK}^{(j-i)}$$

where $L_b$ is the number of pulses contained in one burst of the payload data; m is an integer; K is the ratio between the time separating two consecutive pulses of one burst and the sampling period; $b_i$ and $b_j$ are given by a scrambling sequence of the pulses of the payload; and $\hat{w}_{m-iK}^{(1)}$ are the weighting parameters obtained from the weighting output values.

The present invention discloses a low-complexity non-coherent receiver scheme and method for communicating via ultra-wideband (UWB) radio transmission signals. The receiver scheme disclosed here is based on the energy detection principle. However, in contrast to existing low-complexity receivers, it has a more robust performance in the presence of multi-user interference (MUI). In addition, the disclosed receiver scheme accounts for packet structures where the signaling format of the known preamble differs from the signaling format of the payload like it is e.g. the case in the new IEEE 802.15.4a standard.

The disclosed receiver scheme consists of several main components:

A decision rule for non-coherent detection that is close to optimal in cases where preamble signaling is different from the signaling used during the payload. This decision rule depends on parameters that cannot be estimated by existing receiver schemes or receivers.

A thresholding mechanism that can be incorporated into the above decision rule to mitigate the effect of MUI. This threshold mechanism also depends on parameters that cannot be estimated by existing receiver schemes.

A novel receiver architecture that allows for the estimation of the above mentioned parameters. The additional circuitry required with respect to existing designs adds only moderate complexity to the receiver. Besides, it is only needed during the estimation phase. This allows to keep the receiver at a reasonable complexity. Further, a practical implementation of the disclosed receiver architecture allows for some trade-off between increasing sampling frequency and adding additional circuitry, making several alternative design choices possible.

Estimation algorithms that estimate the above mentioned parameters in a fashion robust to MUI.

As described above, low-complexity, non-coherent IR-UWB receivers that are designed to only cope with thermal noise, perform highly suboptimal when they are subject to interference from other devices (multi-user interference, MUI).

As discovered by the inventors of the present application, the robustness of non-coherent IR-UWB receivers to MUI can be substantially enhanced at only a moderate increase of complexity by weighting every sample of the received signal prior to decoding according to a well-designed weighting function. The applied weighting function uses the energy-delay profile of the expected received signal. The weighting function can optionally use a thresholding mechanism to reject dominating interference terms. With the receiver structure disclosed here, both, the energy delay profile as well as the cut-off values used in the thresholding mechanism can be inferred from parameters estimated during reception of the known preamble of a packet. Further, this is possible even with packet structures where the signaling format of the preamble differs from the signaling format of the payload, as it is for example the case with IEEE 802.15.4a.

The invention disclosed here thus comprises two aspects:
1) Robust decoding of received signal by applying a well-designed weighting function;
2) A receiver structure enabling robust estimation of parameters needed to calculate weighting function.

These aspects are described in details below, with reference to the enclosed drawings.

BRIEF DESCRIPTION OF DRAWINGS

The present invention and its advantages will be better understood with reference to the enclosed drawings wherein.

A. DETAILED DESCRIPTION OF THE INVENTION

Figure 1:
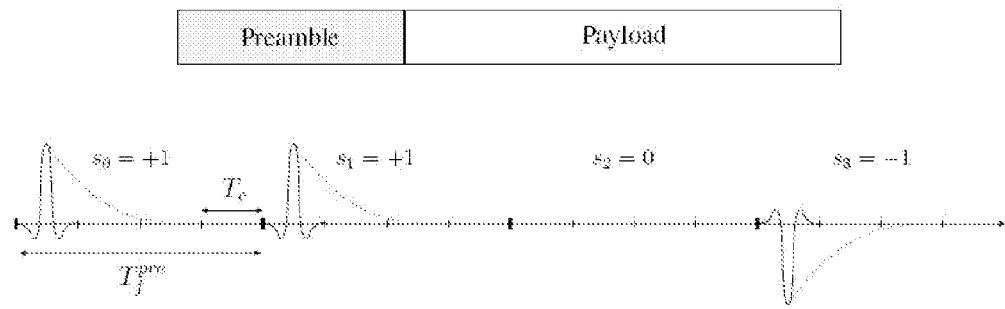
FIG. 1 shows on the upper part, the general structure of a packet that can be used with the method and the receiver of the present invention, and on the lower part, a possible timing structure of the first part of said packet.
Figure 2:
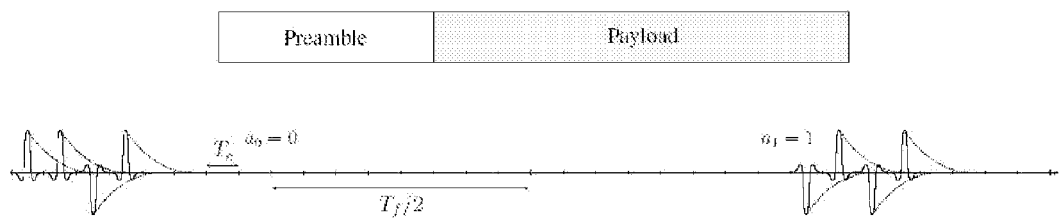
FIG. 2 shows on the upper part, the same structure of a packet as in the upper part of FIG. 1 and, on the lower part, a possible timing structure of the second part of said packet.

1) System Model and Assumptions: Assume a packet structure as it is used e.g. in IEEE 802.15.4a. Such a packet structure is disclosed in FIGS. 1 and 2. More specifically, FIGS. 1 and 2 shows on the upper part, a packet structure comprising a preamble and a payload. The lower part of FIG. 1 illustrates the preamble. As an example, in FIG. 1, the preamble part of the packet is formed of a ternary preamble code sequence s=(+1, +1, 0, −1). Possible multipath components are represented with a dashed line. The lower part of FIG. 2 illustrates a possible timing structure of the payload part of a packet assuming bursts of four scrambled pulses. No time-hopping is shown in this example. Binary pulse position modulation (BPPM) is assumed. Accordingly, the first symbol shown is sent in the first half of the first frame and conveys a "0", whereas the second symbol is sent during the second half of the second frame and thus conveys a "1". Note the difference in signaling between preamble and payload. The main time-unit of a packet is a chip of duration Tc. A certain number of subsequent chips together form a frame. Every packet consists of two parts: a preamble known at the receiver, followed by a payload that carries the unknown data bits. The preamble is principally used for synchronization but once the receiver is synchronized to the sender, its known structure can also be exploited to e.g. do channel estimation. The preamble consists of $N^{pre}$ frames of duration $T_f^{pre}$.

At most one (possibly modulated) single pulse is sent per frame. The last part of the preamble may be composed of a special sequence (start frame delimiter, SFD) to delimit the preamble from the payload. The payload is divided into $N^{pay}$ frames of duration $T_f$ and one symbol is sent per frame using a modulation format suitable for non-coherent reception (e.g. binary pulse position modulation, BPPM). The signaling format of the payload may differ from the preamble in that a symbol may be composed of a burst of $L_b$ pulses instead of only a single pulse as it was the case in the preamble. The sender may change the polarity of each pulses composing a burst according to a scrambling sequence known to the receiver. During both preamble and payload, a time-hopping sequence known to the receiver may be used to determine the position of a pulse or burst of pulses, respectively. We assume that due to the nature of the preamble, either due to the time-hopping sequence or due to modulation according to a known preamble code (e.g. the ternary sequence in 802.15.4a), there are a certain number of chips during the preamble where the receiver can exclude that a pulse has been sent.

The received signal during the preamble then has the following format $$x^{pre}(t) = \sum_{i=0}^{N^{pre}-1} s_i \cdot h(t - iT_f^{pre}) + n(t) \quad (1)$$

where h(t) is the unknown received waveform, n(t) accounts for thermal noise and MUI and $s_i$ is given by a known preamble code (e.g. $s_i \in \{-1, 0, +1\}$ in the case of the IEEE 802.15.4a ternary sequence). For simplicity, we here assume regularly spaced pulses and no time-hopping during the preamble.

The received signal comprising the payload has the following format assuming BPPM $$x^{pay}(t) = \sum_{i=0}^{N^{pay}-1} \sum_{j=0}^{L_b-1} b_{ij} \cdot h(t - iT_f - c_iT_c - a_iT_f/2 - jT_c) + n(t) \quad (2)$$

where $a_i \in \{0, 1\}$ is the $i^{th}$ symbol of the payload which is unknown, $c_i$ denotes the time-hopping sequence and $b_{ij} \in \pm 1$ is given by the scrambling sequence. To ease notation but without loss of generality we consider only the first symbol (i.e. we set i=0 and drop the index i) and we assume $c_0=0$ $$x^{pay}(t) = \sum_{j=0}^{L_b-1} b_j \cdot h(t - a_0T_f/2 - jT_c) + n(t) \quad (3)$$

Figure 3:
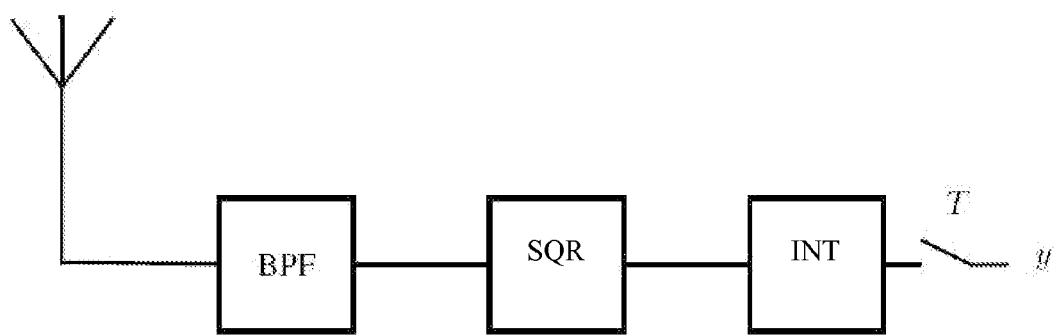
FIG. 3 shows an energy detection structure as used in a receiver of the prior art.

2) Classical Energy Detection Receivers: The basic structure of a classical energy detection receiver is shown in FIG. 3. During both preamble and payload, a classical energy detection receiver squares the received signal x(t) in a device noted SQR in FIG. 3 after some initial filtering in a filter referred to as BPF in FIG. 3. The squared signal is integrated in a device referred to as INT and the output of the integrator is sampled at a certain rate 1/T (T is called the integration time), yielding the following sequence of observations $$y_m = \int_{mT}^{(m+1)T} x^2(t)dt \quad (4)$$

where every sample $y_m$ thus corresponds to the received signal energy in a window of duration T. $y_m$ is called "weighting output values" in the following description. Note that (4) holds independently of whether the received signal x(t) was observed during the preamble or during the payload. In the following we denote by $y_m^{pre}$ the observation obtained according to (4) during the preamble (x(t)=$x^{pre}$(t)) and by $y_m^{pay}$ the observation obtained during the payload (x(t)=$x^{pay}$(t)).

To the best of our knowledge, existing designs further neglect the impact of MUI and assume that n(t) is purely additive white Gaussian noise (AWGN) with power spectral density $N_0/2$.

To decide on the sent symbol $a_0$, some existing architectures simply compare the energy received in the first half of the frame to the energy received in the second half. If the energy received during the first half is bigger than the energy received in the second half they decide on $a_0=0$ and vice versa. Optionally the integration time may be adjusted to prevent the integration of too much noise. These designs have obvious drawbacks when MUI is present in the half of the frame where the sent signal was not present and performance is accordingly poor in these cases.

3) Weighted Energy Detection Receivers: More sophisticated existing architectures weight the observation given by (4) with the energy-delay profile of the channel prior to the decision process. The energy-delay profile is given by $$w_m = \int_{mT}^{(m+1)T} h^2(t)dt \; m=0, \ldots, N-1 \text{ where } N=N_pT_c/T \quad (5)$$

The decision is then taken according to $$\sum_{m=0}^{N-1} y_m^{pay} \cdot w_m \underset{a_0=1}{\overset{a_0=0}{\gtrless}} \sum_{m=T_f/2T}^{T_f/2T+N-1} y_m^{pay} \cdot w_m \quad (6)$$

It can be shown that an energy detection receiver employing above decision rule is close to optimum according to the maximum-likelihood (ML) criterion if n(t) is assumed AWGN and $L_b=1$, i.e. there are no bursts in the payload.

Assuming that perfect synchronization has been obtained between sender and receiver, the weighting output value obtained during the $i^{th}$ pulse of the preamble can be written as $$\begin{aligned}y_{m,i}^{pre} = &s_i^2 \int_{(iN+m)T}^{(iN+m+1)T} h^2(t-iNT)dt + \\ &\int_{(iN+m)T}^{(iN+m+1)T} h^2(t-iNT)dt + \\ &2s_i \int_{(iN+m)T}^{(iN+m+1)T} h(t-iNT)n(t-iNT)dt\end{aligned} \quad (7)$$

where m=0, ..., N−1. Assuming n(t) AWGN with zero mean and taking expected values, an estimate $\hat{w}_m$ of $w_m$ (herein called weighting parameters) can be obtained from the preamble as $$\hat{w}_m = \frac{1}{M_1} \sum_{i:s_i \neq 0} y_{m,i}^{pre} - \underbrace{\frac{1}{M_0} \sum_{i:s_i=0} \sum_m y_{m,i}^{pre}}_{\hat{n}} \quad (8)$$

where $M_1$ and $M_0$ are the number of terms in the first and second summation, respectively. The second summation is obtained by summing over all samples where the received signal is not present and $\hat{n}$ is thus an estimate of the noise energy contained in a window of duration T.

a) Shortcomings of Weighted Energy Detection Receivers: While designed to cope with thermal noise only, these more sophisticated designs are slightly more robust to MUI as the weighting function gives less weight to parts of the signal containing less energy. It is typically these parts that are the most vulnerable to MUI. Nevertheless, these designs also suffer from the performance degradations in the presence of MUI mentioned with reference to the classical energy detection receivers. Also, the estimation of the weighting coefficient is not robust to MUI. A small number of large interference samples can lead to a wrong estimation. Moreover, weighting with the energy-delay profile obtained from the preamble signal becomes suboptimal if $L_b>1$, i.e. if the payload is composed of bursts of pulses.

4) MUI-aware Energy Detection Receiver for Burst Transmissions: The receiver architecture disclosed here tries to cope with all of the above problems.

a) Optimal Weighting coefficients for Reception of Burst Transmissions: We can show that in the case of bursts, the following decision rule is close to optimum according to the ML criterion if n(t) is AWGN $$\sum_{m=0}^{N-1} y_m^{pay} \cdot p_m \underset{a_0=1}{\overset{a_0=0}{\gtrless}} \sum_{m=T_f/2T}^{T_f/2T+N-1} y_m^{pay} \cdot p_m \quad (9)$$

where the weighting coefficients or weights $p_m$ are found according to $$p_m = \sum_{i=0}^{L_b-1} w_{m-iK}^{(0)} + 2 \cdot \sum_{i=0}^{L_b-1} \sum_{j=i+1}^{L_b-1} b_i b_j \cdot w_{m-iK}^{(j-i)} \quad (10)$$

where $K=T_c/T$ and $w(l)$ m, l=1, ..., $L_b-1$ is given by $$w_m^{(l)} = \int_{mT}^{(m+1)T} h(t) h(t-l \cdot T_c) dt \quad (11)$$

Only $w_m^{(0)} = w_m$ can be estimated by the existing energy detection receivers given above. Equation (10) thus not only defines a new weighting function but also leads to a new receiver structure allowing to estimate the quantities of the weighting parameter $w_m^{(l)}$. This new receiver structure is described in details below.

b) Thresholding Mechanism to Reduce Impact of MUI: In the presence of MUI, the assumption of n(t) being AWGN does generally not hold. Therefore, our receiver may also use a thresholding mechanism to cope with large MUI terms. For any received sample $y_m^{pay}$ the receiver can calculate a threshold value $v_m$ according to $$v_m = \frac{N_0}{2} F_{NC\chi_{2BT,\lambda m}^2}^{-1} (1-P_{FA}) \quad (12)$$

where $F_{NC\chi_k^2}(x)$ is the cumulative distribution function of a non-central chi-square distribution with k degrees of freedom and non-centrality parameter $$\lambda \frac{N_0}{2}$$

is the power spectral density of the thermal noise, B is the bandwidth of the received signal, given by the band limiting filter, $P_{FA}$ is a small false-alarm probability defining the threshold (alternatively $v_m$ can be seen as the $(1-P_{FA})$-quantile of a non-central chi-square distribution) and $\lambda_m$ is given by $$\lambda_m = \frac{1}{N_0/2} p_m \quad (13)$$

The threshold can be made adaptive by adjusting $P_{FA}$ according to feedback from the physical layer. Increasing $P_{FA}$ leads to a lower threshold and vice versa.

As can be seen from (12) and (13), the threshold value $v_m$ depends on the weighting coefficients $p_m$ as well as on the thermal noise level. Both quantities have to be estimated during the preamble phase. The receiver then applies a non-linear threshold operation governed by the threshold $v_m$ to the received samples prior to the decision process to mitigate or even reject high interference terms. Thinkable non-linear operations are for example to null samples above the threshold $$y_m^{pay} = y_m^{pay} \forall m: y_m^{pay} \leq v_m$$

$$y_m^{pay} = 0 \forall m: y_m^{pay} > v_m \quad (14)$$

to limit samples above the threshold to the threshold $$y_m^{pay} = y_m^{pay} \forall m: y_m^{pay} \leq v_m$$

$$y_m^{pay} = v_m \forall m: y_m^{pay} > v_m \quad (15)$$

or to set samples above the threshold to the value of the estimated energy-delay profile $$y_m^{pay} = y_m^{pay} \forall m: y_m^{pay} \leq v_m$$

$$y_m^{pay} = p_m \forall m: y_m^{pay} > v_m \quad (16)$$

Other non-linear operations based on the threshold value $v_m$ are of course possible, the simple and common choices given here just serve for illustration.

c) Weighting and Thresholding While Searching Start Frame Delimiter (SFD): A similar weighting and thresholding operation can be applied to the preamble signal when the receiver is looking for the start frame delimiter (SFD) used to delimit the preamble from the payload. In this phase, the receiver is synchronized to the sender and has typically estimated all the parameters needed for decoding the payload. It can thus already exploit some of this knowledge to find the SFD. In particular, it may weight the received signal with the weighting coefficients $p_m$ given by (10) and calculate and apply the threshold given in (12). Note that in both cases $L_b$ of course has to be adjusted to reflect the signaling used during the SFD (e.g. $L_b=1$ during the SFD in the case of IEEE 802.15.4a).

d) Receiver Structure Enabling Estimation of Additional Parameters: It already has been stated that the above manipulations of the received samples during the decoding phase make it necessary to estimate quantities that cannot be estimated by a classical or weighted energy detection receiver. This is especially the case for the values of the weighting parameter $w_m^{(l)}$ needed for calculating the weighting coefficient and given in (11). To this end, our receiver employs $L_b-1$ additional branches with respect to a classical energy detection receiver as can be seen on FIG. 4. More specifically, FIG. 4 discloses a receiver structure in the case of payload signaling with bursts of four pulses ($L_b=4$) and an integration time T shorter than or equal to the duration of one chip $T_c$ ($K \geq 1$). The $l^{th}$ additional branch delays the received signal by $l \cdot T_c$ and multiplies the received signal with this delayed version. The resulting signal is then integrated and sampled to yield weighting output values $y^{pre,(l)}$. $\hat{W}_m^{(0)}$ can be obtained from the undelayed branch $y^{pre,(0)}$ in the same way as $\hat{W}_m^{(l)}$ (8). The other values $\hat{W}_m^{(l)}, l \in \{1, ..., L_b-1\}$ can be obtained in a similar way from the other branches only that due to the statistics of the signal, there is no noise term $\hat{n}$ to subtract $$\hat{w}_m^{(l)} = \frac{1}{M} \sum_{i:s_i \neq 0} y_{m,i}^{pre,(l)} \quad (17)$$

From the quantities $\hat{W}_m^{(l)}, l \in \{0, ..., L_b-1\}$ an estimate of the weights or weighting coefficients $\hat{p}_m$ can be directly calculated using (10) under the condition that K=Tc/T is an integer greater than or equal to one or in other words $T \leq Tc$. In this case the receiver with the structure given in FIG. 4 is able to calculate the optimal weights.

Figure 4:
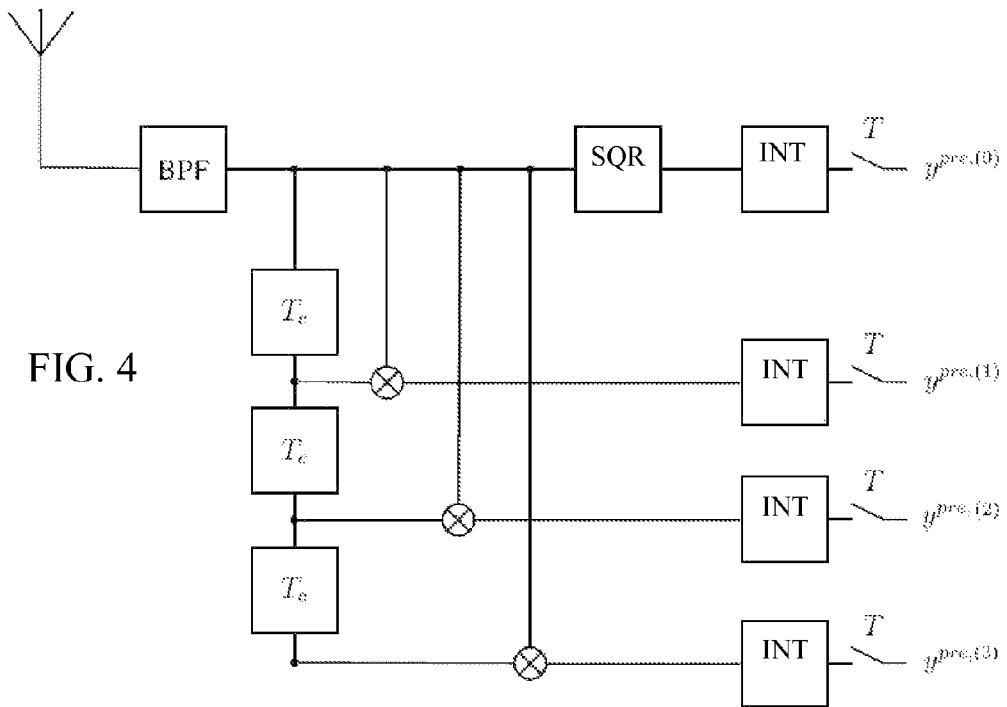
FIG. 4 discloses a structure of a receiver according to the present invention.
Figure 5:
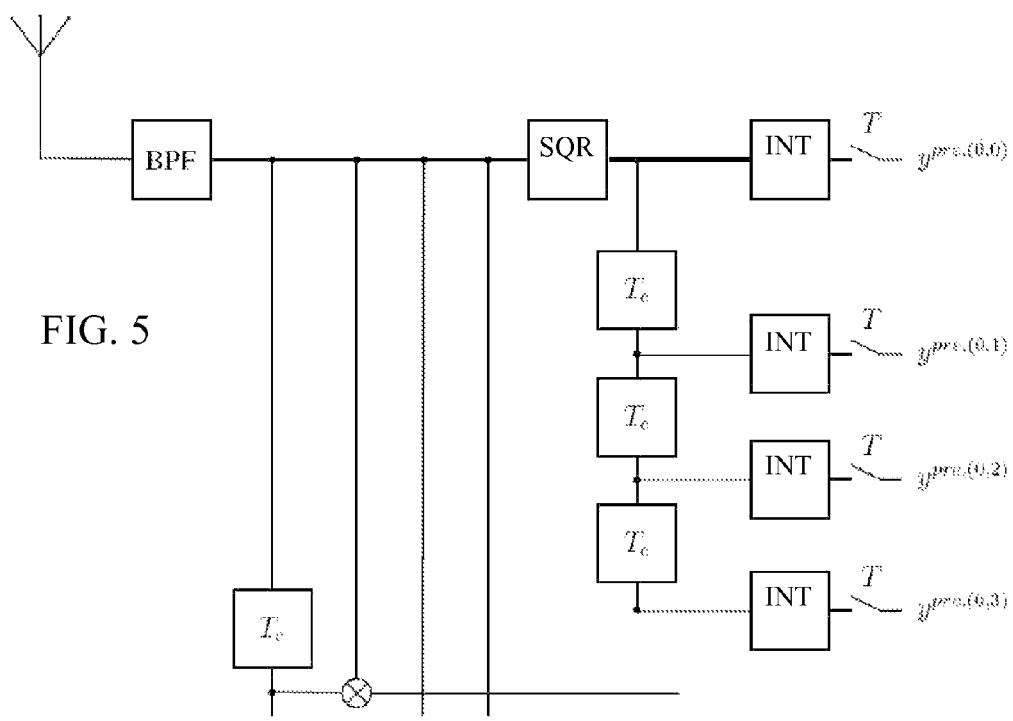
FIG. 5 shows a detail of the structure of the receiver of FIG. 4 for the case where the integration time exceeds the length of a chip.

If however $K^{-1}$ is an integer greater than one, i.e. if a larger integration time and lower sampling frequency is desired, a maximum of $L_b-1-l$ additional integrators parallel to the single one depicted in FIG. 4 are needed in the $l^{th}$ branch. However, not all additional integrators are necessary, indeed depending on $L_b$ and K and the particular branch l some of them can be removed because they are redundant. An example for $L_b=4$ and $T=4Tc$ is shown in FIG. 5. There is thus a tradeoff between a lower possible sampling frequency and a higher number of parallel integrators required. Let $\hat{W}_m^{(l,k)}$ be the quantity obtained for the $k^{th}$ integrator of the $l^{th}$ branch using (8) (for l=0) or (17) (for l≠0). The weights $\hat{p}_m$ can then be found as $$\hat{p}_m = \sum_{i=0}^{L_b-1} \hat{w}_m^{(0,i)} + 2 \cdot \sum_{i=0}^{L_b-1} \sum_{j=i+1}^{L_b-1} b_i b_j \cdot \hat{w}_m^{(j-i,i)} \quad (18)$$

Note that in either case, K≦1 and K<1, the additional complexity with respect to a classical energy detection receiver is only needed during the estimation of the energy delay profile. During the other phases of packet reception, synchronization and decoding, the additional circuitry is not used. This also limits the additional memory requirements of this more sophisticated receiver.

In addition to the weights $p_m$ or weighting coefficients, we also have to estimate the noise power spectral density $N_0/2$ which is used to calculate the threshold value $v_m$. An estimate can be obtained from $\hat{n}$ given in (8) as $$\frac{\hat{N}_0}{2} = \frac{\hat{n}}{2BT} \quad (19)$$

e) Robust Parameter Estimation Using Order Statistics: If done according to (8) and (17) estimation of $\hat{W}_m^{(l)}$ and $\hat{n}$ is not robust to MUI if the number of samples used to calculate the sample means in (8) and (17) is small and/or if the interference level is very high. A more robust option is in these cases to use order statistics to calculate these estimates by replacing the sample means in (8) and (17) by the sample median which is more robust to outliers. If $\hat{n}$ has been calculated in this way (19) has to be replaced by $$\frac{\hat{N}_0}{2} = \frac{\hat{n}}{2BT - 2/3} \quad (20)$$

The estimation of $\hat{w}_m^{(0)}$ can be further made more robust to MUI by not considering all available samples $y_{m,i}^{pre}$ when averaging according to (8). From (11) it can be seen that due to the squaring operation in the receiver, interference can only be additive for the term $w_m^{(0)}$. Therefore, terms in the received signal suffering from MUI are likely to have a larger energy than terms that do not suffer from MUI. Based on this observation, (8) can optionally be replaced by $$\hat{w}_m = \frac{1}{M_1} \sum_{i:s_i \neq 0, y_{m,i}^{pre} \leq y_m^{pre,\alpha}} y_{m,i}^{pre} - \underbrace{\frac{1}{M_0} \sum_{i:s_i=0} \sum_m y_{m,i}^{pre}}_{\hat{n}} \quad (21)$$

where only samples below a threshold $y_m^{pre,\alpha}$ are taken into account in the first summation. $y_m^{pre,\alpha}$ is the $\alpha$%-quantile of the observation $y_{m,i}^{pre}$ (meaning that $\alpha$% of the observed samples lie below the value $y_m^{pre,\alpha}$). $\alpha$ is a design parameter that can be adjusted based on the expected interference level. $y_m^{pre,\alpha}$ can be estimated from the received $y_{m,i}^{pre}$ by e.g. storing a set of samples and taking the sample $\alpha$%-quantile over the stored set. The number of terms M1 in the first summation would then be fewer with respect to (8) but typically include those that suffer less from the effect of MUI.

Figure 6A:
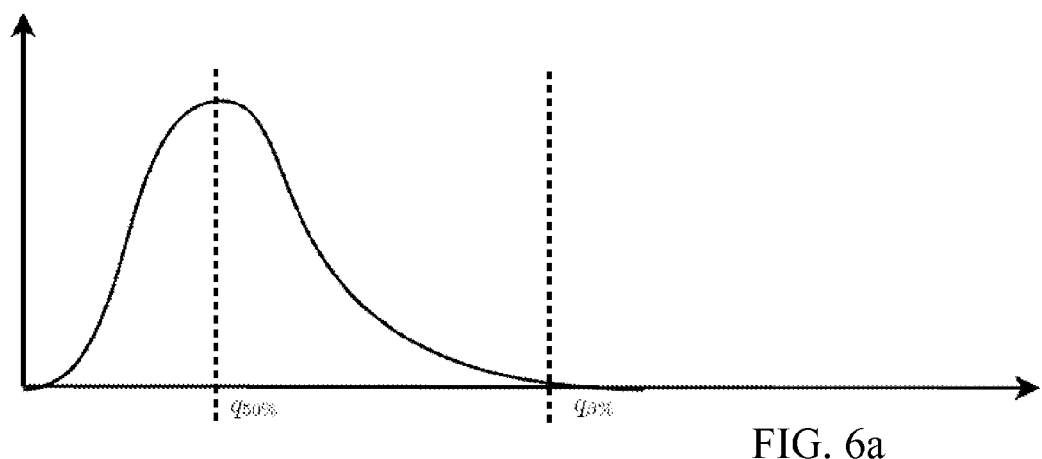
FIG. 6a shows a schematic representation of the distribution of the received signal if it consists of noise only.
Figure 6B:
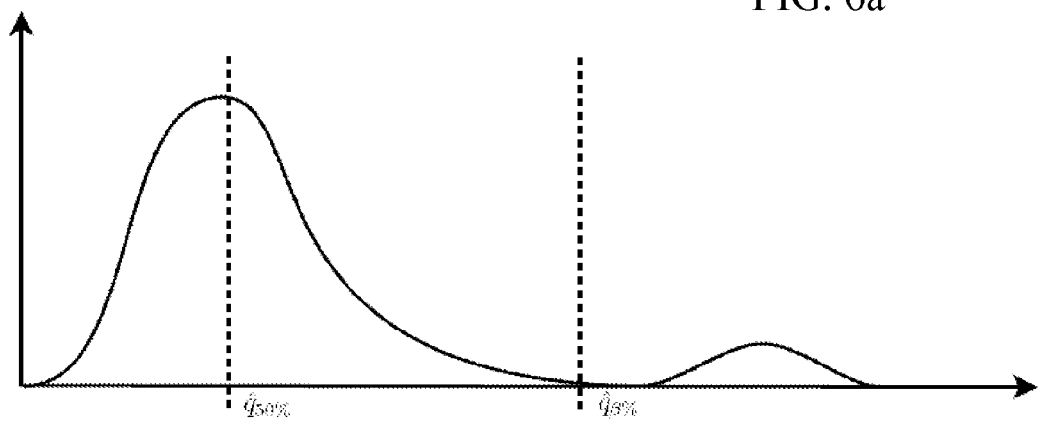
FIG. 6b shows the distribution of the received signal if it consists of noise and interference.

Note that other similar thresholding schemes based on $\alpha$%-quantiles are also thinkable, e.g.

$$\hat{w}_m = \frac{1}{M_1} \sum_{i:s_i \neq 0, \bar{y}_i^{pre} \leq \bar{y}^{pre,\alpha}} y_{m,i}^{pre} - \underbrace{\frac{1}{M_0} \sum_{i:s_i=0} \sum_m y_{m,i}^{pre}}_{\hat{n}} \quad (22)$$

where $$\bar{y}_i^{pre} = \sum_m y_{m,i}^{pre}$$

and $\bar{y}^{pre,\alpha}$ denotes the $\alpha$%-quantile of the observations $\bar{y}_i^{pre}$. Robustness to MUI of the quantity $\hat{n}$ used in noise statistic estimation (19) can also be further enhanced by applying a similar concept. If there is no interference, we know that the distribution of the noise samples follows a chi-square distribution with known number of degrees of freedom. The corresponding probability density function when the received signal consists of noise only is shown in FIG. 6a. $q_{50}$ denotes the median (or 50%-quantile) of the distribution, $q_\beta$ denotes the β%-quantile with β≧50, β<100. Here, again, interference is purely additive due to the squaring operation in the energy detection receiver. A schematic representation of the probability density function when the received signal consists of noise and interference is shown in FIG. 6b where the outliers at the right end of the distribution are due to interference. When estimating $\hat{n}$, we would like these outliers not to contribute to the second summation of (8) ((21), (22), respectively). We achieve this by rejecting samples that lie above a threshold $\hat{q}_\beta$ that corresponds to an estimate of the β%-quantile of the "noise-only" distribution (in other words, if the probability that a sample does not come from the "noise-only" chi-square distribution is greater than β, we reject the sample and do not include it in the summation).

The remaining question is how to determine the threshold $\hat{q}_\beta$. Because we do not know the noise variance, we cannot calculate $q_\beta$ analytically and set $\hat{q}_\beta = q_\beta$. However, we know that the shape of the "noise-only" distribution is chi-square so we can calculate the fraction $$\varphi = \frac{q_\beta}{q_{50}} \quad (23)$$

which is independent of the noise variance and only depends on the number of degrees of freedom of the distribution which we know. Further, we can easily determine the sample median of our observation $\hat{q}_{50}$ (It is usually robust to outliers and thus quite close to $q_{50}$). We can thus find the threshold as $$\hat{q}_\beta = \varphi \cdot \hat{q}_{50} \quad (24)$$

IV. PERFORMANCE EVALUATION

Figure 7:
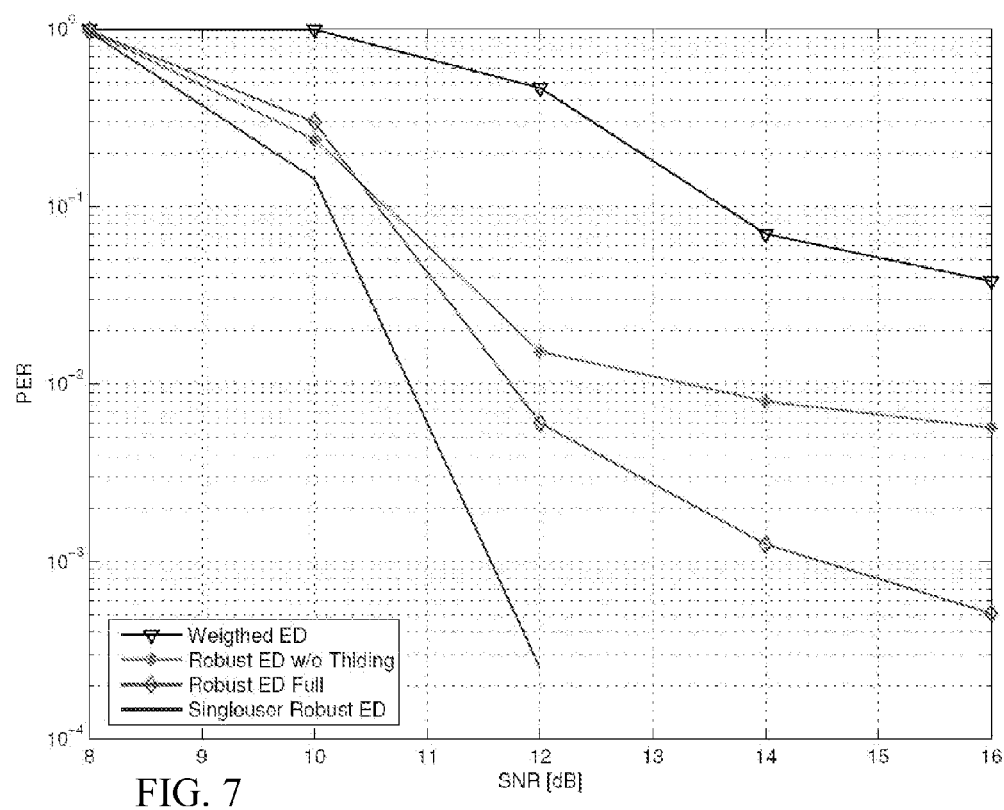
FIG. 7 illustrates a first example of the performance gain achievable with the present invention in a scenario with one equal power interferer.
Figure 8:
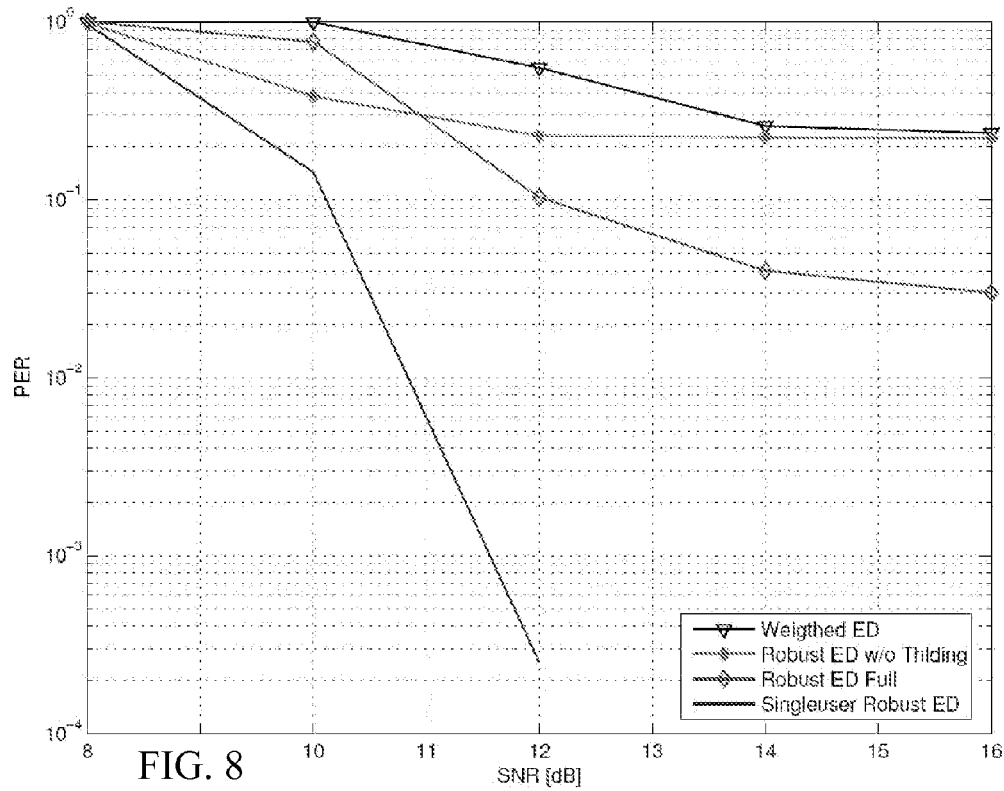
FIG. 8 illustrates a second example of the performance gain achievable with the present invention in a scenario with one near interferer.

FIGS. 7 and 8 show results of a performance evaluation for two scenarios. One with an interferer that has a received power equal to the user of interest (low to medium interference scenario; FIG. 7) and one showing a near-far scenario with an interferer having a received power ten times higher than the user of interest (high interference scenario; FIG. 8). Both Figures show the performance in terms of packet error rate (PER) versus signal-to-noise-ratio (SNR). Each figure shows four curves: "Weighted ED" corresponds to the performance of existing weighted energy detection receivers that cannot estimate the optimal weighting coefficients according to (11); "Robust ED w/o Thlding" corresponds to the receiver of the present invention having the new structure that allows it to estimate the optimal weighting coefficients but not using the thresholding mechanisms to reduce impact of MUI; "Robust ED Full" corresponds to the receiver of the present invention estimating the optimal weighting coefficients and rejecting interference through the thresholding mechanism disclosed here; "Singleuser Robust ED" is a reference curve showing the performance of the receiver of the present invention if it is not subject to interference.

It can be seen from FIG. 7 that in the case of low to medium interference using the optimal weighting coefficients amounts to a performance gain of about one order of magnitude in terms of PER with respect to an existing receiver; additionally employing the thresholding mechanism gives an additional gain of again about one order of magnitude.

It can be seen from FIG. 8 that in the case of high interference, the new receiver without thresholding only performs marginally better than existing weighted energy detectors. However, if thresholding is activated, it again gains about one order of magnitude in PER with respect to existing architectures.

V. INDUSTRIAL SECTORS, APPLICATIONS, AND ECONOMIC POTENTIAL

The method and the receiver of the present invention directly apply to IEEE 802.15.4a receivers and by extension to the IEEE 802.15.4 standard also known as ZigBee.

With the proliferation of wireless networks, not only as Ethernet cable replacements but also for sensor networks, enabling environmental control, home automation, medical applications, industrial and building automation, . . . interference between devices will increase. Interference can come from similar devices, the so-called in-system interference (for instance, two networks operating in the same area), or from external devices (for instance, created by a narrowband interferer). Our invention greatly reduces the impact of in-system interference.

As such, as the number of deployed networks increase, the performance of these networks and those already installed will be affected by the increase of interference. Solutions to combat interference and to reduce its impact will be required. Our invention addresses this issue at a very moderate complexity increase. Indeed, for the analog front-end of our receiver, the supplementary filters and analog-to-digital converters are only required during the channel estimation phase. This amounts to roughly 5% of the total duration of the reception of a packet. The trade-off between the increase of power consumption and the reduction of packet loss due to interference clearly justifies this small increase in receiver complexity and the small impact on the power consumption.

REFERENCES

[1] M. Flury, R. Merz, J.-Y. le Boudec, and J. Zory, "Performance evaluation of an ieee 802.15.4a physical layer with energy detection and multi-user interference," in *Ultra-Wideband, 2007. ICUWB 2007. IEEE International Conference on*, September 2007, pp. 663-668.

[2] Z. Sahinoglu and I. Guvenc, "Method for selecting energy threshold for radio signal," Patent application, WO/2007/018133, 2007, patent holder: Mitsubishi Electric Research Laboratories.

[3] Z. Sahinoglu and F. M. Porikli, "Constructing an energy matrix of a radio signal," Patent application, WO/2006/112850, 2006, patent holder: Mitsubishi Electric Research Laboratories.

[4] A. F. Molisch, I. Guvenc, and Z. Sahinoglu, "Method and receiver for identifying a leading edge time period in a received radio signal," Patent application, WO/2007/011357, 2007, patent holder: Mitsubishi Electric Research Laboratories.

[5] A. El Fawal and J.-Y. Le Boudec, "Synchronizing method for impulse radio network," US Patent application 20060093077, May 4, 2006.

[6] F. S. Lee and A. P. Chandrakasan, "A 2.5nj/b 0.65v 3-to-5 ghz subbanded UWB receiver in 90 nm CMOS," in *ISSCC 07*, February 2007.

[7] C. Carbonelli and U. Mengali, "M-ppm noncoherent receivers for uwb applications," *IEEE Trans. Wireless Commun.*, vol. 5, no. 8, pp. 2285-2294, 2006.

[8] M. Weisenhorn and W. Hirt, "Robust noncoherent receiver exploiting UWB channel properties," in *Ultra Wideband Systems, 2004. Joint with Conference on Ultrawideband Systems and Technologies. Joint UWBST & IWUWBS. 2004 International Workshop on*, May 2004, pp. 156-160.

[9] M. E. Sahin, I. Guvenc, and H. Arslan, "Optimization of energy detector receivers for UWB systems," in *IEEE Spring VTC 05*, vol. 2, 2005. 18

[10] M. Nemati, U. Mitra, and R. Scholtz, "Optimum integration time for UWB transmitted reference and energy detector receivers," in *IEEE MILCOM 06*, October 2006, pp. 1-7.

[11] Z. Tian and B. Sadler, "Weighted energy detection of ultra-wideband signals," in *IEEE SPAWC 05*, June 2005, pp. 10 168-1072.

[12] M. Weisenhorn and W. Hirt, in *Ultra-Wideband, 2005. ICU 2005. 2005 IEEE International Conference on*, 2005, pp. 6 pp. +.

[13] A. A. D'Amico, U. Mengali, and E. Arias-De-Reyna, "Energy-detection uwb receivers with multiple energy measurements," *IEEE Trans. Wireless Commun.*, vol. 6, no. 7, pp. 2652-2659, 2007.

[14] P. S. Z. M. A. F. Duan, Chunjie Orlik, "A non-coherent 802.15.4a uwb impulse radio," in *Ultra-Wideband, 2007. ICUWB 2007. IEEE International Conference on*, September 2007, pp. 146-151.

[15] A. Spaulding and D. Middleton, "Optimum reception in an impulsive interference environment—part i: Coherent detection," *IEEE Trans. Commun.*, vol. 25, no. 9, pp. 910-923, 1977.

[16] S. Kassam and H. Poor, "Robust signal processing for communication systems," *IEEE Commun. Mag.*, vol. 21, no. 1, pp. 20-28, 1983.

[17] R. Knopp and Y. Souilmi, "Achievable rates for uwb peer-to-peer networks," in *Communications, 2004 International Zurich Seminar on*, 2004, pp. 82-85.

[18] R. Merz, J. Widmer, J.-Y. Le Boudec, and B. Radunovic, "A joint PHY/MAC architecture for low-radiated power TH-UWB wireless ad-hoc networks," *Wireless Communications and Mobile Computing Journal, Special Issue on Ultra wideband (UWB) Communications*, vol. 5, no. 5, pp. 567-580, August 2005.

[19] M. Flury and J.-Y. Le Boudec, "Interference mitigation by statistical interference modeling in an impulse radio uwb receiver," in *Ultra-Wideband, The 2006 IEEE 2006 International Conference* on, September 2006, pp. 393-398.

[20] N.C. Beaulieu and B. Hu, "An adaptive threshold soft-limiting uwb receiver with improved performance in multiuser interference," in *Ultra-Wideband, The 2006 IEEE 2006 International Conference* on, 2006, pp. 405-410.

[21] J. Mitra and L. Lampe, "Robust detectors for th it-uwb systems with multiuser interference," in *Ultra-Wideband, 2007. ICUWB 2007. IEEE International Conference* on, September 2007, pp. 745-750.

The invention claimed is:

1. A method for retrieving data from Ultra wideband radio transmission signals received by a receiver and transmitted in packets containing at least a preamble known to the receiver and a payload containing data unknown to the receiver, said payload data being formed of at least one burst containing at least one pulse, said method comprising the steps of:

receiving a first signal corresponding to a preamble of a packet by a receiver;

determining a first energy of the received first signal;

determining an estimation of weighting coefficients from the first energy of the received first signal;

receiving a second signal corresponding to a payload of the packet by the receiver;

determining a second energy of the received second signal;

calculating a threshold depending on the estimation of the weighting coefficients; and applying a decision rule for retrieving the data based on the determined second energy, weighted by said estimation of the weighting coefficients and depending on said calculated threshold.

2. The method according to claim 1, wherein the payload is formed of at least one burst containing at least two pulses, and wherein the step of determining the estimation of the weighting coefficients comprises the steps of:

providing time delayed copies of said received signal, the number of copies being equal to the number of pulses per burst, minus one;

processing said received signal and said time delayed cpies of the recieved signals to obtain a number of output signals corresponding to the number of pulses per burst;

sampling said processed signals and said received signal to obtain weighting output pre values $y_{m,i}^{pre}$; and calculating weighting parameters from said weighting output values;

calculating said estimation of the weighting coefficients according to the following equation:

$$\hat{p}_m = \sum_{i=0}^{L_b-1} \hat{w}_{m-iK}^{(0)} + 2\sum_{i=0}^{L_b-1}\sum_{j=i+1}^{L_b-1} b_i b_j \hat{w}_{m-iK}^{(j-i)}$$

where $\hat{p}_m$ are estimated weighting coefficients, $L_b$ is the number of pulses contained in one burst of the payload data; in is an integer; K is a ratio between a time separating two consecutive pulses of one burst and a sampling period; $b_i$ and $b_j$ are given by a scrambling sequence of the pulses of the payload; an $\hat{w}_{m-ik}^{(1)}$ are weighting parameters obtained from the weighting output values.

3. The method according to claim 2, wherein the processing of said time delayed copies of the received signals and said received signal comprises a step of combining the said received signal with one of said copies of the received, for each time delayed signal, each combination providing one weighting output value $y_{m,i}^{pre}$ at a time, and wherein the weighting parameters $\hat{w}_m^{(1)}$ are a combination of a plurality of weighting output values.

4. The method according to claim 1, wherein weighting parameters are obtained from the preamble according to the following equation:

$$\hat{w}_m = \frac{1}{M_1}\sum_{i;s_i\neq 0} y_{m,i}^{pre} - \frac{1}{M_0}\sum_{i;s_i=0}\sum_m y_{m,i}^{pre}$$

where $\hat{w}_m$ are the weighting parameters, $M_1$ and $M_0$ are the number of terms in the first and second summation, respectively, the weighting output value $y_{m,i}^{pre}$ is the $i^{th}$ received signal energy in a window of predetermined duration, and $s_i$ is given by a known preamble code.

5. The method according to claim 4, wherein, in the first summation, $$\frac{1}{M_1}\sum_{i;s_i\neq 0} y_{m,i}^{pre},$$

only samples of $y_{m,i}^{pre}$ below a given threshold are taken into account.

6. The method according to claim 4, wherein in the second summation, $$\frac{1}{M_0}\sum_{i;s_i=0}\sum_m y_{m,i}^{pre},$$

only samples below a given threshold $\hat{q}_\beta$ are taken into account, where $\hat{q}_\beta$ is a product of the sample median and a scaling factor $\phi$, where $\phi$ is a ratio of the $\beta$%-quantile and a median of a $\chi$-square distribution.

7. The method according to claim 4, wherein a value of a sample mean $$\frac{1}{M_1}\sum_{i;s_i\neq 0} y_{M,l}^{pre} - \frac{1}{M_0}\sum_{i;s_i=0}\sum_m y_{m,i}^{pre}$$

is replaced by a sample median.

8. The method according to claim 1, wherein a sampling period is shorter or equal to the time between two consecutive pulses of one burst of the payload.

9. The method according to claim 1, wherein a sampling period is greater than a time between two consecutive pulses of one burst of the payload.

10. The method according to claim 1, wherein said method is applied on data contained in the preamble.

11. The method according to claim 1, wherein said method is applied on data indicating a beginning of the payload.

12. The method according to claim 1, wherein weighting parameters are obtained from weighting output values by using order statistics.

13. The method according to claim 1, wherein the preamble has a different signaling format from a signaling format of the payload.

14. A receiver for receiving and retrieving data from Ultra wideband radio transmission signals transmitted in packets containing at least a preamble known to the receiver and a payload containing data unknown to the receiver, said payload data being formed of at least one burst containing at least one pulse, said receiver comprising:

means for receiving a first signal corresponding to a preamble of a packet by the receiver;
means for determining a first energy of the received first signal;
means for determining an estimation of weighting coefficients from the first energy of the first received signal;
means for receiving a second signal corresponding to a payload of the packet by the receiver;
means for determining the second energy of the received second signal;
means for calculating a threshold depending on the estimation of the weighting coefficients; and
means for applying a decision rule for retrieving the data based on the determined second energy, weighted by said estimation of the weighting coefficients and depending on said calculated threshold.

15. The receiver according to claim 14, wherein said payload data is formed of at least one burst containing at least two pulses, wherein said means for determining the estimation of weighting coefficients comprises:

means for providing time delayed copies of said received signal, the number of copies being at least equal to the number of pulses per burst, minus one;
means for processing said received signal and said time delayed copies of the received signals to obtain a number of output signals corresponding to the number of pulses per burst;
means for sampling said processed signals and said received signal to obtain weighting pre output values $y_{m,i}^{pre}$; and
means for calculating weighting parameters from at least one weighting output value;
wherein the estimation of the weighting coefficients is calculated according to the following equation:

$$\hat{p}_m = \sum_{i=0}^{L_b-1} \hat{w}_{m-iK}^{(0)} + 2 \sum_{i=0}^{L_b-1} \sum_{j=i+1}^{L_b-1} b_i b_j \hat{w}_{m-iK}^{(j-i)}$$

where $\hat{p}_m$ are estimated weighting coefficients, $L_b$ is the number of pulses contained in one burst of the payload data; m is an integer; K is a ratio between a time separating two consecutive pulses of one burst and a sampling period; $b_i$ and $b_j$ being given by a scrambling sequence of the pulses of the payload; and $\hat{w}_{m-iK}^{(1)}$ is the weighting parameter obtained from a $l^{th}$ output signal.

16. A method for calculating an estimation of weighting coefficients used for retrieving data from Ultra wideband radio transmission signals received by a receiver and transmitted in packets containing at least a preamble known to the receiver and a payload containing data unknown to the receiver, said payload data being formed of at least one burst containing at least two pulses, said method comprising the steps of:

receiving a signal corresponding to the preamble of a packet by a receiver;
determining an energy of the received signal;
providing time delayed copies of said received signal, the number of copies being equal to the number of pulses per burst, minus one;
processing said received signal and said time delayed copies of the received signals to obtain a number of output signals corresponding to the number of pulses per burst;
sampling said processed signals and said received signal to obtain weighting output Values $y_{m,i}^{pre}$;
calculating weighting parameters from said weighting output values; and
calculating an estimation of the weighting coefficients from the weighting parameters, said estimation of the weighting coefficients calculated according to the following equation:

$$\hat{p}_m = \sum_{i=0}^{L_b-1} \hat{w}_{m-iK}^{(0)} + 2 \sum_{i=0}^{L_b-1} \sum_{j=i+1}^{L_b-1} b_i b_j \hat{w}_{m-iK}^{(j-i)}$$

where $\hat{p}_m$ are estimated weighting coefficients, $L_b$ is the number of pulses contained in one burst of the payload data; m is an integer; K is a ratio between the a separating two consecutive pulses of one burst and a sampling period; $b_i$ and $b_j$ are given by a scrambling sequence of the pulses of the payload; and $\hat{w}_{m-iK}^{(1)}$ are the weighting parameters obtained from the weighting output values.

17. The method according to claim 16, wherein the preamble has a different signaling format from a signaling format of the payload.

18. The method according to claim 2, wherein the weighting parameters $\hat{w}_m$ are obtained from the preamble according to the following equation:

$$\hat{w}_m = \frac{1}{M_1} \sum_{i; s_i \neq 0} y_{m,i}^{pre} - \frac{1}{M_0} \sum_{i; s_i = 0} \sum_m y_{m,i}^{pre}$$

where $M_1$ and $M_0$ are the number of terms in the first and second summation, respectively and the weighting output value $y_{m,i}^{pre}$ is the $i^{th}$ received signal energy in a window of predetermined duration and $s_i$, is given by a known preamble code.

19. The method according to claim 18, wherein, in the first summation, $$\frac{1}{M_1} \sum_{i; s_i \neq 0} y_{m,i}^{pre},$$

only samples of $y_{m,i}^{pre}$ below a given threshold are taken into account.

20. The method according to claim 18, wherein in the second summation, $$\frac{1}{M_0} \sum_{i; s_i = 0} \sum_m y_{m,i}^{pre},$$

only samples below a given threshold $\hat{q}_\beta$ are taken into account, where $\hat{q}_\beta$ is a product of a sample median and a scaling factor $\phi$, where $\phi$ is a ratio of a $\beta\%$-quantile and a median of the $\chi$-square distribution.

21. The method according to claim 18, wherein the value of the sample mean $$\frac{1}{M_1} \sum_{i; s_i \neq 0} y_{m,i}^{pre} - \frac{1}{M_0} \sum_{i; s_i = 0} \sum_m y_{m,i}^{pre}$$

is repaced by the sample median.

* * * * *